United States Patent
Platen et al.

(10) Patent No.: US 7,977,829 B2
(45) Date of Patent: Jul. 12, 2011

(54) HOUSING OF AN ELECTRICAL MACHINE COMPRISING COOLING CHANNELS EXTENDING IN A HOUSING WALL

(75) Inventors: Markus Platen, Bad Neustadt (DE); Sebastian Räder, Bastheim (DE); Michael Zisler, Euerdorf-Wirmsthal (DE)

(73) Assignee: Siemens Aktiengesellschaft, München (DE)

( * ) Notice: Subject to any disclaimer, the term of this patent is extended or adjusted under 35 U.S.C. 154(b) by 450 days.

(21) Appl. No.: 11/577,458

(22) PCT Filed: Oct. 14, 2005

(86) PCT No.: PCT/EP2005/055284
§ 371 (c)(1),
(2), (4) Date: Jun. 8, 2009

(87) PCT Pub. No.: WO2006/042832
PCT Pub. Date: Apr. 27, 2006

(65) Prior Publication Data
US 2009/0243446 A1 Oct. 1, 2009

(30) Foreign Application Priority Data
Oct. 18, 2004 (DE) .................. 10 2004 050 645

(51) Int. Cl.
*H02K 9/19* (2006.01)
*H02K 5/20* (2006.01)

(52) U.S. Cl. .................. 310/54; 310/58; 310/59

(58) Field of Classification Search .............. 310/52–59, 310/89
See application file for complete search history.

(56) References Cited

U.S. PATENT DOCUMENTS

| | | | |
|---|---|---|---|
| 2,627,582 A | 2/1953 | Hayes | |
| 3,525,001 A | 8/1970 | Erickson | |
| 4,908,538 A * | 3/1990 | Geberth, Jr. | 310/59 |
| 5,084,642 A | 1/1992 | Katsuzawa et al. | |
| 5,281,877 A * | 1/1994 | Kazmierczak et al. | 310/59 |
| 5,448,118 A * | 9/1995 | Nakamura et al. | 310/54 |
| 5,616,973 A * | 4/1997 | Khazanov et al. | 310/54 |
| 7,576,458 B2 * | 8/2009 | Wehner et al. | 310/54 |

FOREIGN PATENT DOCUMENTS

| | | |
|---|---|---|
| DE | 91 12 631 U1 | 3/1993 |
| DE | 42 29 395 C2 | 6/1995 |
| DE | 299 04 809 U1 | 8/2000 |
| EP | 0 924 839 | 6/1999 |
| EP | 1 241 772 A1 | 9/2002 |
| JP | 2004112967 | 4/2004 |

\* cited by examiner

*Primary Examiner* — Tran N Nguyen
(74) *Attorney, Agent, or Firm* — Henry M. Feiereisen; Ursula B. Day

(57) ABSTRACT

The invention relates to a housing (2) for an electrical machine (1), said housing comprising a housing wall (3) having an inner surface (4). At least two cooling channels (15) extend inside the housing wall. A connecting deviation channel (16) is provided between two of the cooling channels (15). The inventive housing is also provided with an inner sealing ring (18) applied to the inner surface (4). The housing wall (3) comprises at least one housing recess (17) on the inner surface (4) thereof, in the region of the inner sealing ring (18), such that, together with the inner sealing ring (18), it forms the deviation channel (16).

10 Claims, 5 Drawing Sheets

HOUSING OF AN ELECTRICAL MACHINE COMPRISING COOLING CHANNELS EXTENDING IN A HOUSING WALL

BACKGROUND OF THE INVENTION

The invention relates to a housing of an electrical machine comprising a housing wall which has an inner surface and within which housing wall at least two cooling channels extend.

A housing of this type, designed in particular for liquid cooling of the electrical machine, is used for example as an extruded profile component. The electrical machine can be constructed as an electric motor or else as an electric generator. The cooling channels extend substantially in the axial direction, that is to say in the direction of an axis of rotation of a rotor rotatably mounted within the housing. The deflection of the cooling liquid guided within the cooling channels during operation is carried out at both axial ends of the housing in a bearing shield, in an intermediate flange or by means of a deflection plate. For the purpose of guiding the cooling liquid by deflection, in this case cast-in or subsequently bored channels or pipes are used in the bearing shield or intermediate flange, implemented in particular as a casting.

In this implementation, the sealing between the housing on the one hand and the bearing shield, the intermediate flange or the deflection plate on the other hand is normally carried out by surface sealing means. This form of sealing requires considerable expenditure during production and from time to time nevertheless does not lead to satisfactory results.

SUMMARY OF THE INVENTION

The object of the invention is to specify a housing of the type designated at the beginning which comprises efficient and low-expenditure deflection for the coolant.

This object is achieved by a housing of an electrical machine, comprising a housing wall which has an inner surface and within which housing wall at least two cooling channels (15) extend, wherein
a) a connecting deflection channel is provided between two of the cooling channels,
b) an inner sealing ring resting on the inner surface is provided, and
c) in the region of the inner sealing ring on the inner surface, at least one housing recess which, together with the inner sealing ring, forms the deflection channel is provided in the housing wall.

The deflection provided by the invention renders complicated construction measures or subsequent machining measures on a bearing shield or on an intermediate flange superfluous. Likewise, it is possible to dispense completely with a separate deflection plate. Furthermore, the surface sealing means which, in the prior art, can be implemented only with considerable expenditure from the point of view of process safety, are dispensed with. In contrast, in the housing according to the invention, in particular at least at one lateral axial end, use is made of a simple inner sealing ring which, in conjunction with a recess in the housing wall, which can likewise be produced simply, forms the deflection channel. As a result, the expenditure on fabrication decreases considerably. At the same time, the desired function of the deflection is nevertheless ensured by these simple means. In particular, it is also possible for the seal to be implemented considerably more simply and with higher process safety.

One variant is beneficial, in which the housing recess by means of which the deflection channel is formed is so large that it covers the two cooling channels to be connected. The housing recess can in this case be implemented as a milled recess in the housing wall on the inner surface over a certain region in the circumferential direction. The dimensions in the circumferential direction and in the radial direction, that is to say substantially in the direction of the thickness of the housing wall, are determined such that the two cooling channels extending within the housing wall each have an additional opening on account of the housing recess. A housing recess of this type in the form of a milled recess may very easily be introduced subsequently into the housing, which, in particular, is constructed as an extruded profile.

Furthermore, the inner sealing ring can also have an annular recess, which likewise contributes to the formation of the deflection channel. In particular, the deflection channel is then formed by means of two housing recesses, preferably like drilled holes, which each cover one of the two cooling channels to be connected, and the annular recess. Both the housing recesses belonging to the opening of the two cooling channels and the annular recess, in particular once more formed as a milled recess, can be produced simply and subsequently.

According to another variant, the inner sealing ring rests on the housing wall with a form fit. For instance, it is pressed in, shrunk in or else adhesively bonded in. These measures do not give rise to any great expenditure on fabrication either.

The inner sealing ring is preferably formed as a flat ring or as a ring having an L-shaped profile. Both configurations are standard shapes for a ring, which can thus be procured or produced easily.

Between the inner sealing ring and the housing wall, on both axial sides of the housing recess, in each case sealing means, in particular in the form of an O-ring, are preferably provided. An O-ring of this type is a familiar sealing means and, in terms of mounting and handling, is considerably simpler than a flat sealing means.

In one refinement, in which the inner sealing ring has an L-shaped profile with two limbs, sealing means, once more in particular in the form of an O-ring, are preferably provided in each of the two limbs, for the purpose of sealing with respect to the housing wall. In this refinement, the advantages described above also result on account of the possible use of the standard O-rings. In addition, the L-shaped profile permits the cooling channels and the deflection channel to be terminated and preferably also sealed in the radial and axial direction.

Also beneficial is a variant in which, within the housing wall, a winding system having at least one winding overhang is arranged and the inner sealing ring is arranged substantially in the region of the winding overhang. By means of this advantageous measure, deflection is achieved without the (external) dimensions of the electrical machine having to be enlarged, in particular in the axial direction, as is the case for example in the prior art, which provides an additional intermediate flange or an additional deflection plate for the purpose of deflection. The edge dimension is maintained. Increasing the overall length in the axial direction is not necessary.

BRIEF DESCRIPTION OF THE DRAWING

Further features, advantages and details of the invention emerge from the following description of three exemplary embodiments by using the drawing, in which.

DETAILED DESCRIPTION OF PREFERRED EMBODIMENTS

In FIGS. 1 to 5, mutually corresponding parts are provided with the same designations.

Figure 1:
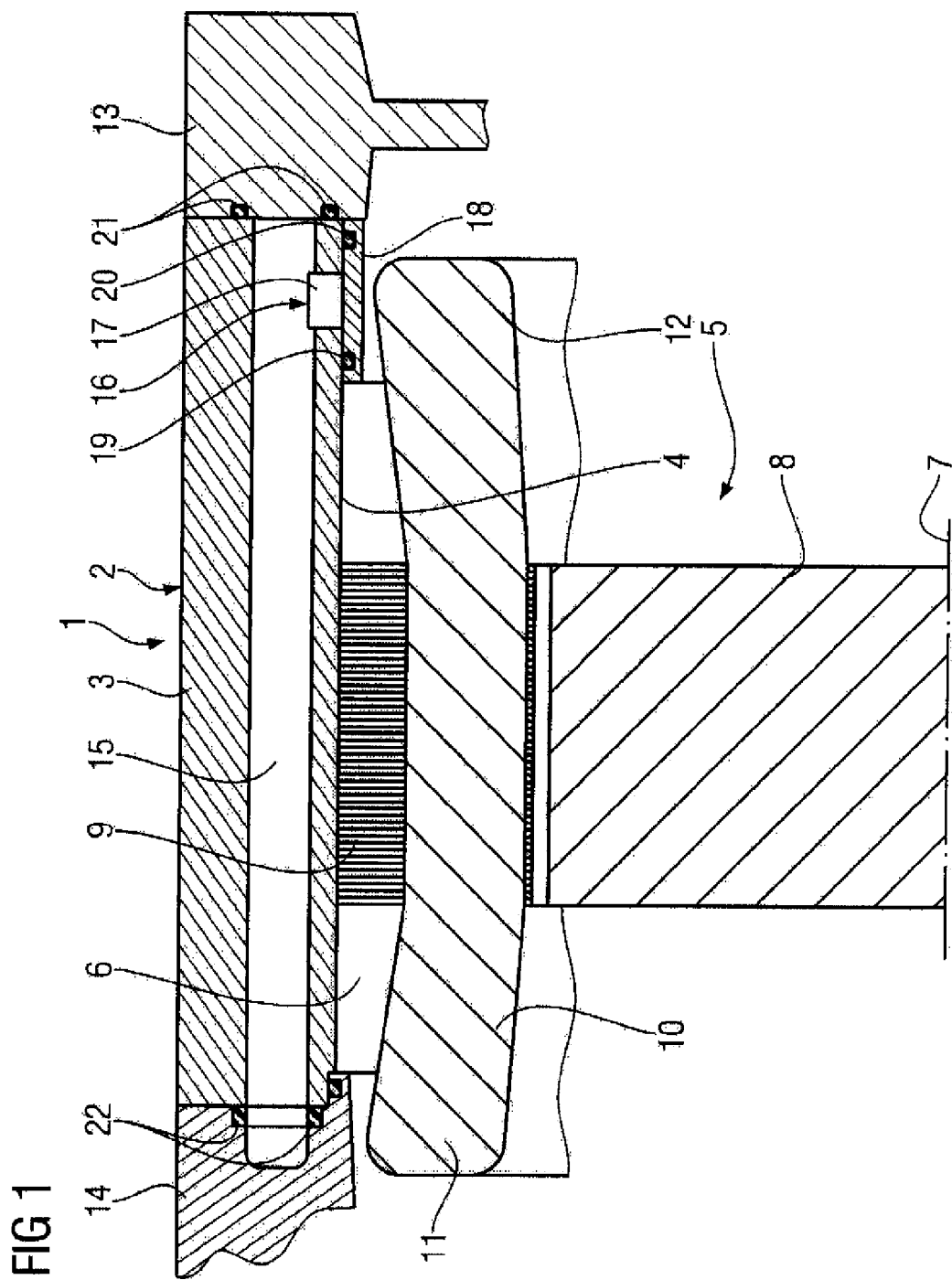
FIG. 1 shows a first exemplary embodiment of a housing comprising a deflection channel formed by means of a flat ring, in a cross-sectional illustration

In FIG. 1, an electrical machine 1 in the form of an electric motor having a first exemplary embodiment of a housing 2 is illustrated in cross section. The housing 2, formed as an extruded profile, has a housing wall 3 with an inner surface 4 which surrounds a hollow cylindrical interior 5. Arranged in the hollow cylindrical interior 5 is a stator 6 firmly anchored in the housing 2, and a rotor 8 mounted such that it can rotate about an axis of rotation 7. The stator 6 comprises stator laminations 9, within which electric conductors of a winding system 10 extend. In the axial direction, that is to say in the direction of the axis of rotation 7, the winding system 10 in each case has a winding overhang 11 and 12 on both sides of the stator laminations 9. The housing 2 is open on both sides in the axial direction. In each case a bearing shield 13 and 14 is provided on the open sides as a termination.

The housing 2 comprises a plurality of cooling channels 15, of which only one is reproduced in the sectional illustration according to FIG. 1. The cooling channels 15 extend in the axial direction, substantially parallel to the axis of rotation 7. Depending on the embodiment, they can be arranged uniformly or grouped in the circumferential direction. In the exemplary embodiment shown in FIGS. 1 and 2, their distribution is non-uniform in the circumferential direction. During the operation of the electrical machine 1, a liquid flows in the cooling channels 15 for the purpose of cooling.

In order to conduct this cooling liquid through all the cooling channels 15, a deflection channel 16 is provided on the side facing the right-hand bearing shield 13, between two adjacent cooling channels 15 in each case. On the side of the left-hand bearing shield 14, on the other hand, the deflection is carried out by means of pockets provided in the bearing shield 14 but not specifically shown. The deflection channel 16 is formed by means of a housing recess 17 and a closing inner sealing ring 18. The housing recess 17 is, for example, a simple milled recess in the housing wall 3, on the inner surface 4. Its depth is so great that, starting from the inner surface 4, it reaches as far as the two cooling channels 15 to be connected. The inner sealing ring 18 is formed as a flat ring in the exemplary embodiment of FIG. 1 and covers the housing recess 17 completely. It is connected to the inner surface 4 via a form fit. In the exemplary embodiment, it is shrunk in. In addition, in the axial direction on both sides of the housing recess 17, between the inner sealing ring 18 and the housing wall 3, in each case an O-ring 19 and 20 is provided for the purpose of sealing with respect to emergence of liquid into the hollow cylindrical interior 5. This seal therefore acts primarily in the radial direction.

Sealing elements 21 and 22 are also provided at the connecting point between the housing 2 and the laterally adjacent bearing shields 13 and 14. By way of example, in the exemplary embodiment of FIG. 1, the left-hand and the right-hand bearing shields 13 and 14 are in each case formed in a different way with respect to emergence of liquid from the cooling channels 15. The respective design of these seals, primarily acting axially, can be chosen as required, for example also as a flat seal. In particular, the sealing elements 21 and 22 are matched to the cross-sectional area of the cooling channels 15 and are thus preferably designed to be relatively small and circular.

The configuration of the deflection channel 16 by means of the housing recess 17 and the inner sealing ring 18 is particularly simple and nevertheless very effective. It can be implemented with relatively little technical expenditure and nevertheless offers high process safety. In addition, it is beneficial that the deflection channel 16 is arranged in the region of the winding overhang 12 which is present in any case, so that, because of the deflection channel 16, no increase in the dimension in the axial direction is necessary. In this beneficial embodiment of the deflection channel 16, the external dimensions of the electrical machine 1 therefore remain completely unchanged.

Figure 2:
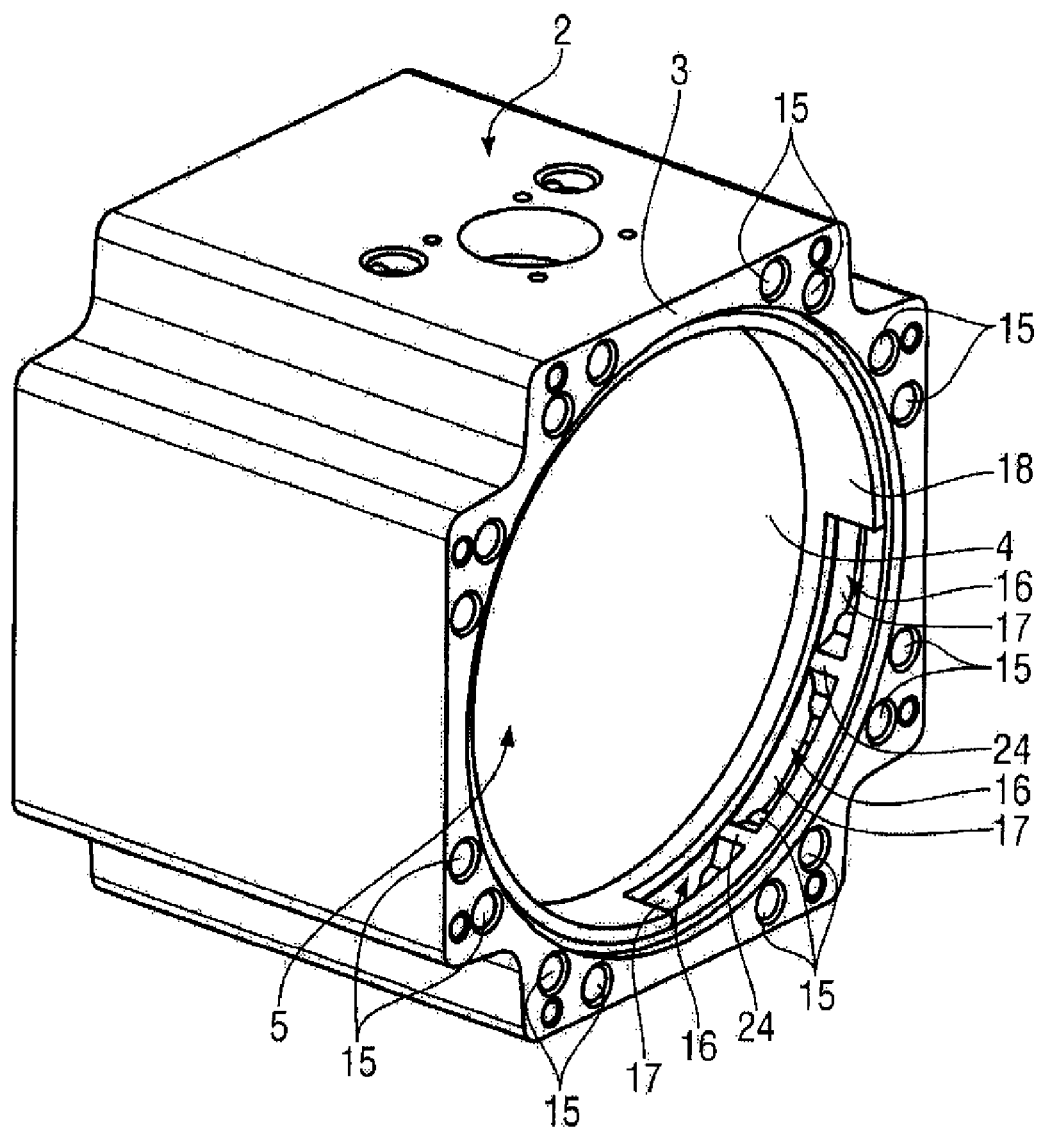
FIG. 2 shows the housing according to FIG. 1 in a perspective illustration.

In FIG. 2, the housing 2 is reproduced perspectively. The flat inner sealing ring 18 is illustrated as cut open at one point in order to make visible the deflection channels 16 located beneath with the housing recesses 17 for connecting two adjacent cooling channels 15 in each case. Deflection channels 16 that are adjacent in the circumferential direction are in each case separated from one another by a dividing web 24.

Figure 3:
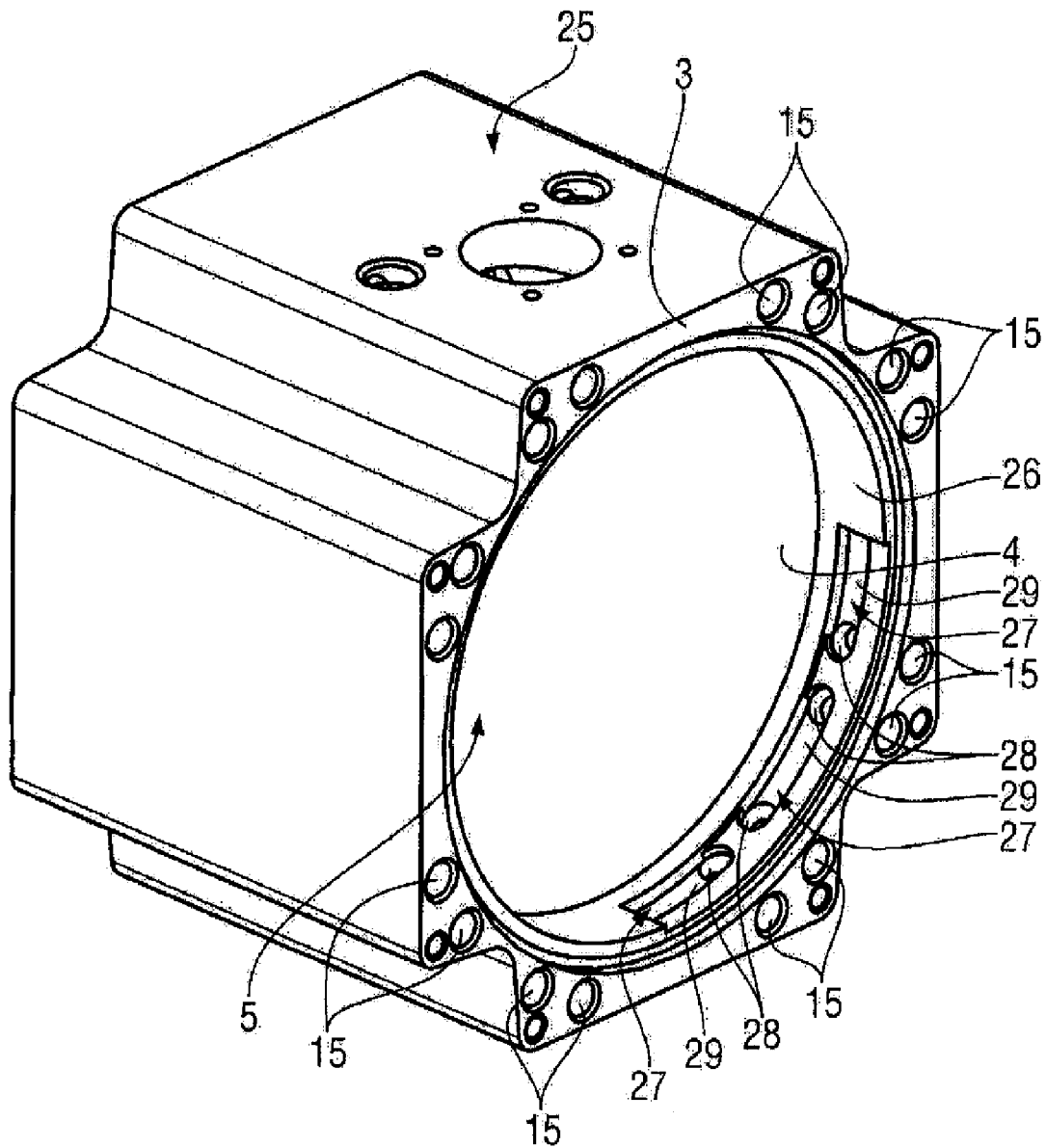
FIG. 3 shows a second exemplary embodiment of a housing comprising a deflection channel formed by means of a flat ring, in a perspective illustration.

In FIG. 3, a further exemplary embodiment of a housing 25 is shown, which is likewise configured as an extruded profile and, in its housing wall 3, comprises a plurality of cooling channels 15 extending axially and arranged distributed in the circumferential direction. At least on the one open side shown, the housing 25 is provided with an inner sealing ring 26, once more designed as a flat ring, by means of which deflection channels 27 are formed between two of the adjacent cooling channels 15 in each case. As distinct from the exemplary embodiment according to FIGS. 1 and 2, housing recesses 20 are provided in the form of drilled holes, which each extend from the inner surface 4 as far as one of the cooling channels 15. In addition, on its side facing the inner surface 4, the inner sealing ring 26 comprises annular recesses 29 which, for example, are milled into the inner sealing ring 26. The deflection channels 27 in this second exemplary embodiment are therefore formed in each case by means of two housing recesses 28 like drilled holes and a milled annular recess 29. The sealing is carried out in a way analogous to the first exemplary embodiment.

Figure 4:
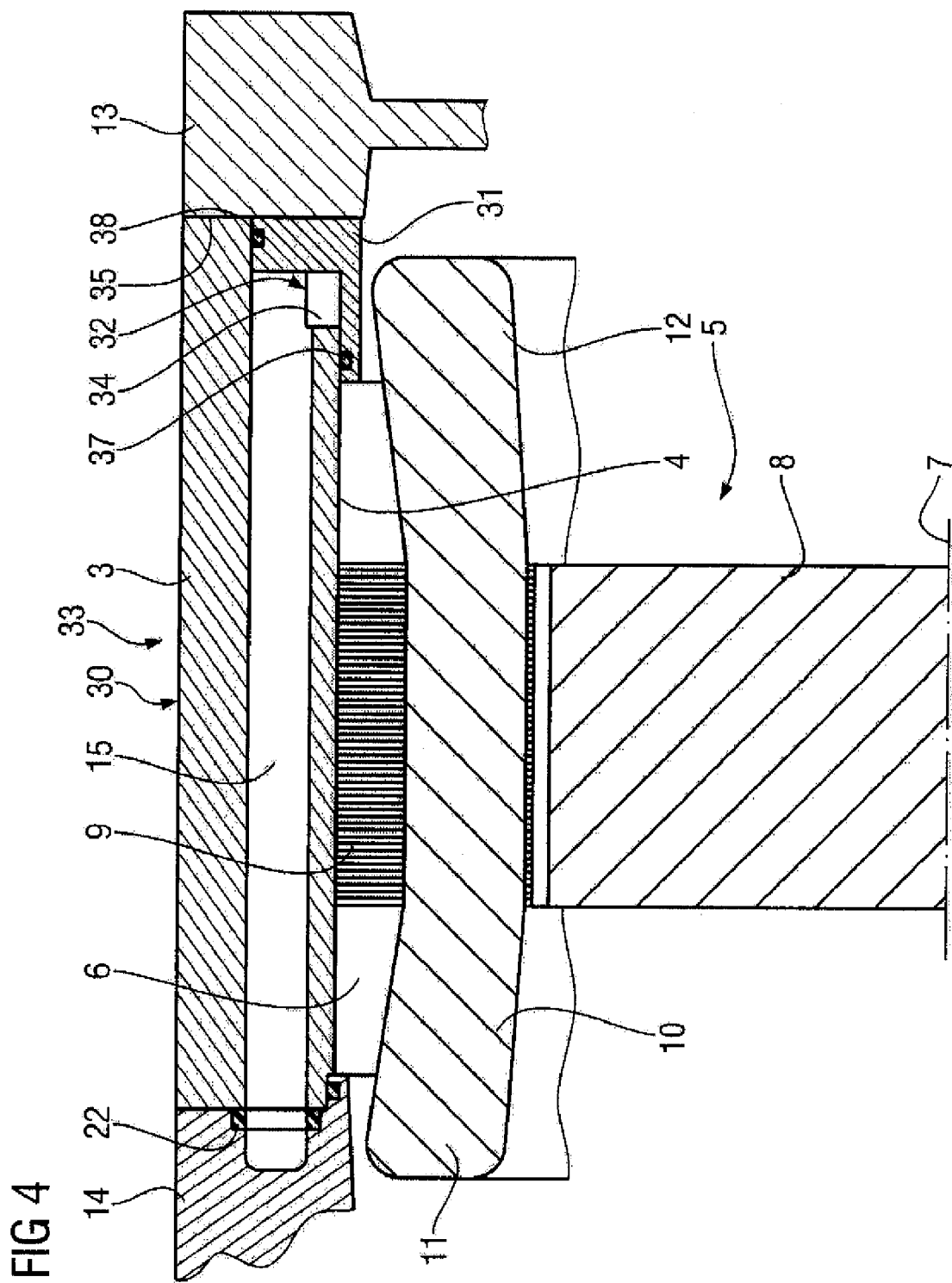
FIG. 4 shows a third exemplary embodiment of a housing comprising a deflection channel formed by means of an L-shaped ring, in a cross-sectional illustration.
Figure 5:
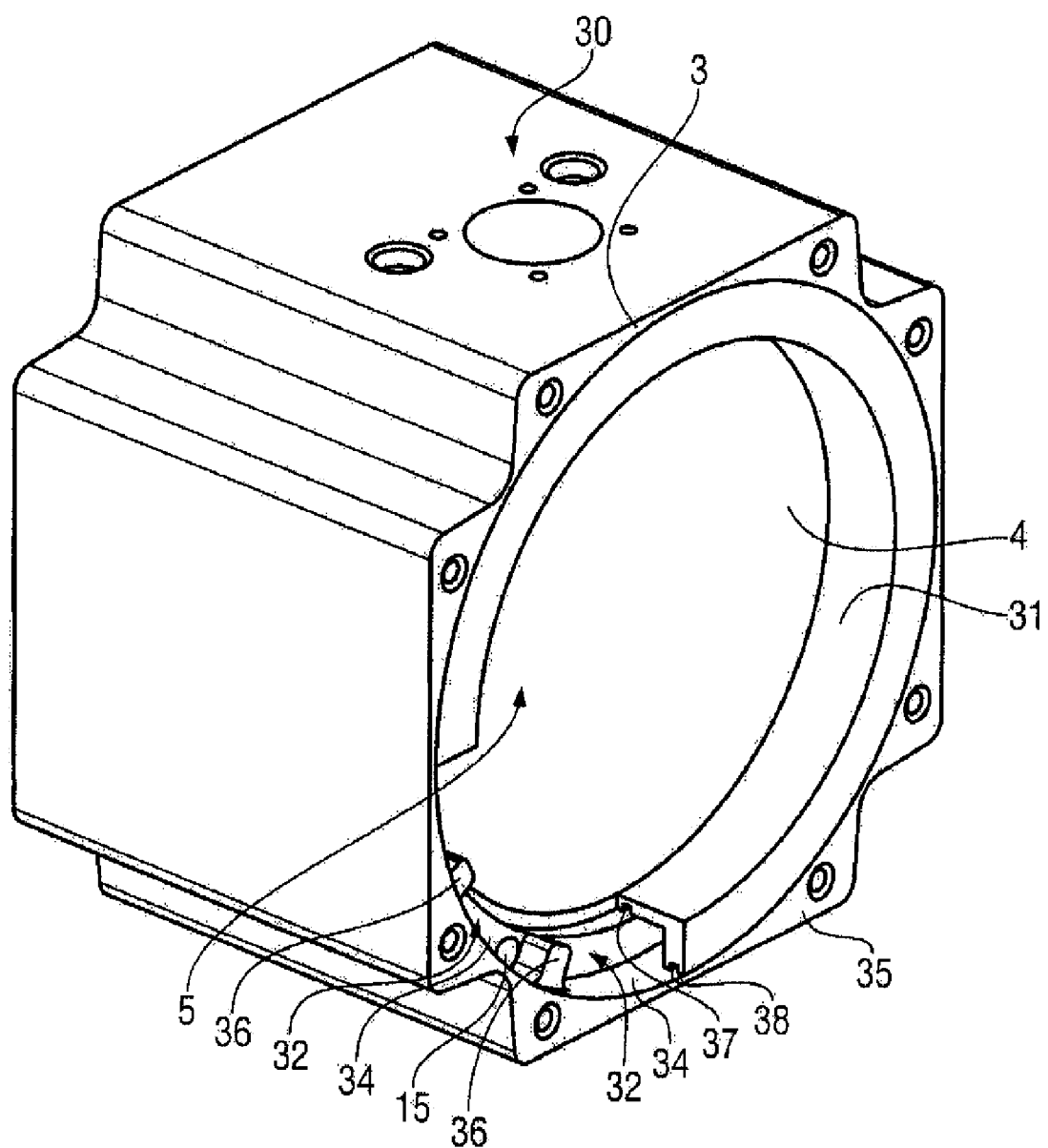
FIG. 5 shows the housing according to FIG. 4 in a perspective illustration.

In FIGS. 4 and 5, a third exemplary embodiment of an extruded housing 30 having an L-shaped inner sealing ring 31 for forming deflection channels 32 is illustrated. The housing 30 is part of an electrical machine 33, which is likewise designed as an electric motor.

The deflection channels 32 in this third exemplary embodiment comprise housing recesses 34, which are milled in on the inner, surface 4 in a lateral edge region 35 of the housing wall 3. As constituent parts of the housing wall 3 which are not removed by the respective milled recesses, there are dividing webs 36 between the individual deflection channels 32. By means of the two limbs of the L-shaped inner sealing ring 31, the deflection channels 32 are closed both in the radial and in the axial direction, and the cooling channels 15 are closed in the axial direction. For the purpose of sealing, in each case an O-ring 37 or 38 is provided between each of the two limbs and the housing wall 3. The L-shaped inner sealing ring 31 therefore acts radially and axially in a closing and sealing manner. As a result, the sealing means otherwise required in the bearing shield 13 to seal the cooling channels 15 axially can be dispensed with in the third exemplary embodiment. In principle, a configuration having annular recesses on the inner sealing ring 31, comparable to those of the second exemplary embodiment according to FIG. 3, is also conceivable in the third exemplary embodiment.

What is claimed is:

1. A housing of an electrical machine, comprising:
   a housing wall having an outer surface and an inner surface, said housing wall having formed between said outer and inner surfaces at least two cooling channels and a deflection channel for connecting the two cooling channels, said housing wall having an open side in an axial direction; and
   an inner sealing ring resting on the inner surface at the open side,
   wherein the housing wall has at least one housing recess formed in the inner surface at a region of the inner surface of the housing wall and the inner sealing ring, wherein the at least one housing recess and the inner sealing ring define the deflection channel of the housing.

2. The housing of claim 1, wherein the deflection channel is formed by means of a single housing recess to fluidly connect the two cooling channels.

3. The housing of claim 1, wherein the inner sealing ring has at least one annular recess for formation of the deflection channel.

4. The housing of claim 3, wherein the deflection channel is formed by a first housing recess which is fluidly connected to one of the two cooling channels, a second housing recess which is fluidly connected to the other of the two cooling channels, and the annular recess.

5. The housing of claim 1, wherein the inner sealing ring is connected to the housing wall by a form fit.

6. The housing of claim 1, wherein the inner sealing ring is formed as a flat ring.

7. The housing of claim 1, wherein the inner sealing ring is formed as a ring with L-shaped profile.

8. The housing of claim 1, further comprising a first sealing member disposed between the inner sealing ring and the housing wall on one side of the housing recess, and a second sealing member disposed between the inner sealing ring and the housing wall on another side of the housing recess.

9. The housing of claim 1, wherein the inner sealing ring has an L-shaped profile with two limbs, and further comprising a first sealing member provided in one of the two limbs for effecting a sealing with respect to the housing wall, and a second sealing member provided in the other one of the two limbs for effecting a sealing with respect to the housing wall.

10. The housing of claim 1 for use in an electrical machine which includes a winding system arranged with at least one winding overhang within the housing wall, wherein the inner sealing ring is, arranged in the region of the winding overhang.

* * * * *